Jan. 12, 1954  T. A. RAINES  2,666,126
AIR BRAKE SYSTEM TANK HEATER
Filed July 16, 1952
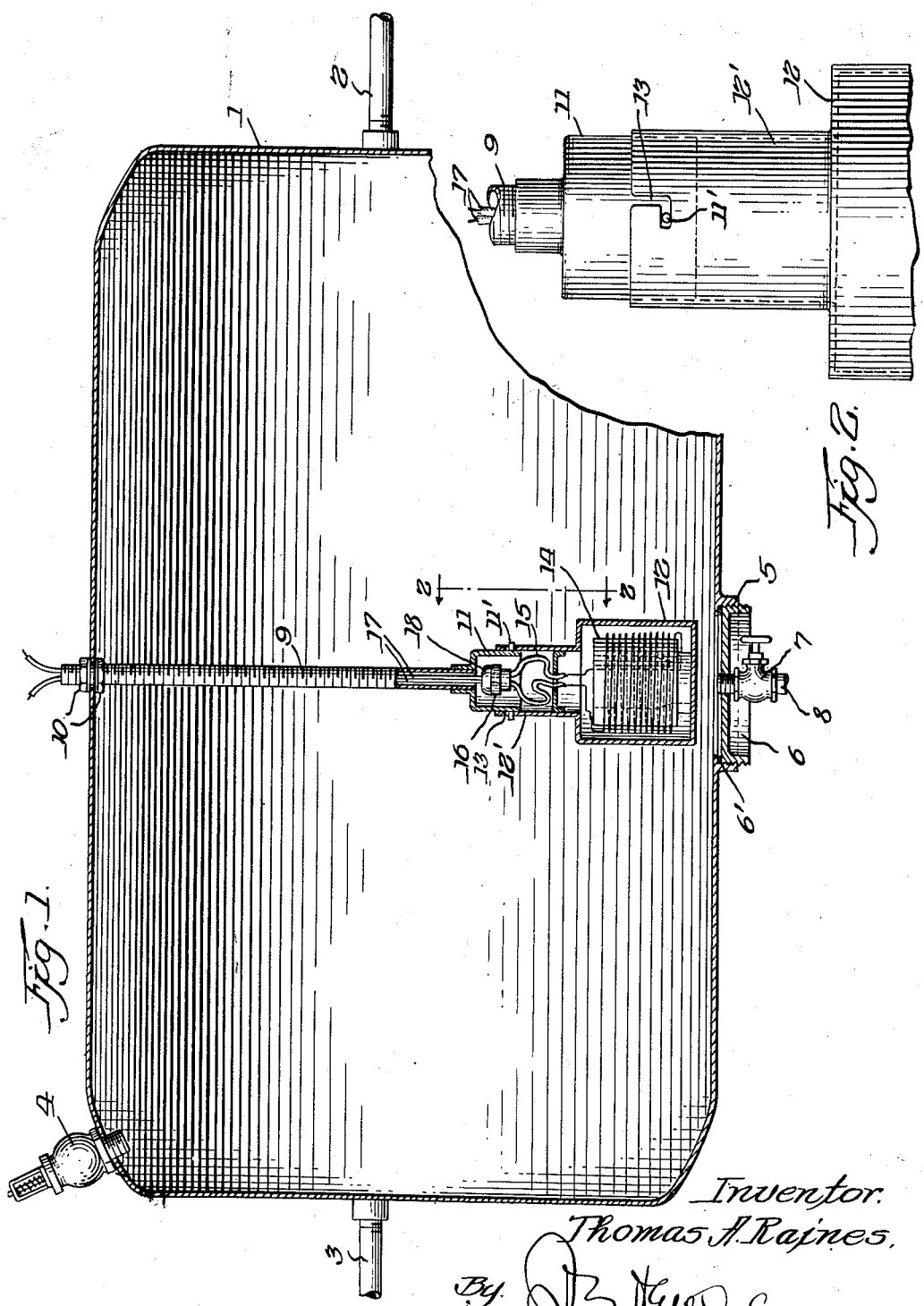
Inventor.
Thomas A. Raines,
By

Patented Jan. 12, 1954

2,666,126

UNITED STATES PATENT OFFICE

2,666,126

AIR BRAKE SYSTEM TANK HEATER

Thomas A. Raines, Bellwood, Ill.

Application July 16, 1952, Serial No. 299,287

2 Claims. (Cl. 219—38)

This invention relates to improvements in tank heating and thawing devices, especially, to a device of such character advantageously adaptable for use in the compressed air storage tanks or reservoirs of the air brake systems of railway rolling stock.

It is an object of the invention to provide a device for installation in the reservoir or storage tank of a railway train air brake system, wherein said reservoir or storage tank is usually carried by and without the train locomotive exposed and subjected to low and freezing temperatures, whereby the compressed air stored therein can and will be brought to a temperature above that of water-freezing degree in order that water of condensation or like moisture incident to its storage and, at times, frozen within the reservoir or tank, will be rendered freely flowable, hence, capable of being entirely or fully drained therefrom and so, prevented from entering into and flowing through the brake system line and its couplings and freezing therein, thereby creating hazardous brake operating conditions or brake operation failures.

Another object of the invention is to provide a compressed air reservoir heater which is of dependable, durable, simple and comparatively cheap construction capable of installation in a reservoir with but a minimum of alteration or modification thereof.

An equally important object of the invention resides in the provision of a heater to which, following its operative installation, convenient and rapid access may be had for purposes of inspection, adjustment, repair or replacement of parts, or the whole thereof.

In the now prevalent types of railway rolling stock air brake systems, especially those where the air for operating the train car brakes is supplied from a reservoir carried by a diesel locomotive, such reservoir is without the locomotive cab. In consequence, during cold or frigid weather or temperatures, condensation occurs and accumulates within the reservoir. The water of condensation, if entered from said reservoir into and flowed through the connected and communicating air brake system line will freeze, or if not, this will be converted into slush form. As a result hazardously faulty brake operation will invariably occur. In some instances, complete brake operation failure will occur.

By the use of my invention, water of condensation accumulated in a compressed air reservoir equipped therewith can be brought to a temperature (particularly if frozen) allowing for its free flow. In consequence, it can be fully and rapidly drained from said reservoir. Thus, that danger associated with its being entered into and flowed through the train air brake line, and under certain atmospheric conditions, freezing therein, will be eliminated. Moreover, since the compressed air within the reservoir is heated to a temperature substantially corresponding to the then prevailing atmospheric temperature, it is manifest that condensation within the reservoir will be reduced to a minimum, hence, that the amount of water therein will be correspondingly reduced. Thereby the hazards or risks incident to its entrance into and flow through a connected air brake line will be most advantageously lessened.

The foregoing, as well as other objects, advantages and meritorious teachings of my invention, will be in part obvious and in part pointed out in the following detailed disclosure thereof, when taken in conjunction with the accompanying drawings, it being understood that the form of the invention presented herein is precise and what is now considered to be the best mode of embodying its principles, but that other modifications and changes may be made in specific embodiments without departing from its essential features.

In the drawings:

Figure 1 is a vertical section through the compressed air reservoir or storage tank of a railway train air brake system (a portion being broken away) with my heater device operatively installed therein, said device being shown partly in section, and Figure 2 is an enlarged fragmentary detail in elevation of the heater housing and the supporting member therefor, illustrating the detachable connection therebetween.

Referring in detail to the accompanying drawings, the compressed air reservoir, of the usual or conventional shape and size as used in railway rolling stock air brake systems, is indicated by the numeral 1, the same being carried by the train locomotive—oftentimes in an exposed position. Said reservoir or storage tank is provided with appropriate inlet and outlet ports receiving conduits 2 and 3, respectively, therein. The conduit 2 is connected to air compressing means (not shown) also carried by the locomotive, while the conduit 3 is, of course, connected to the railway train air brake system (also not shown). A safety blow-off valve 4 may be and preferably is connected to an appropriate portion of the reservoir and communicates with its interior.

In adapting my invention to a reservoir or storage tank, as above, an intermediate portion of the tank bottom has an access providing opening formed therein. This opening is collared and internally screw-threaded, as at 5, and its size is such as to freely admit the hereinafter described heater device therethrough into the reservoir; also, to permit ample and convenient access to be had thereto.

A closure or cover 6 peripherally screw-threaded and of shape and size substantially corresponding to that of the access providing opening is normally engaged in and closes said opening. If desired, a sealing gasket 6' may be provided to or seated on a suitably shouldered portion of the opening collar 5 whereby, when engaged by an adjacent portion of the opening received closure 6, a fluid tight connection will be assured. A drain valve 7, which may be manually operable, as shown in the accompanying drawings, or automatically operable, if desired or required, is connected to an intermediate portion of the outer side of the closure 6. Said valve, of course, communicates with the reservoir interior when its carrying closure 6 is engaged in the bottom thereof, as above described.

If desired, the drain valve 7 may be connected to a discharge pipe 8 of suitable length, so that when opened the water and air discharged therethrough will be safely directed and disposed of.

Engaged through an intermediate portion of the reservoir top is an external, screw-threaded, tubular member 9, whose upper and engaged end has opposed gasket supplied lock nuts 10 turned thereon into fixed engagement with adjacent sides of said top. Thus, the supporting member is substantially rigidly supported within the reservoir. The length of the supporting member is such that its inner or lower end is disposed in proximity to the reservoir bottom. By adjusting the positioning of the lock nuts 10 on the supporting member it will be understood that the spacing between its inner end and the reservoir bottom may be adjusted or varied, as required.

An inverted cup-like fixture 11 is fixedly engaged with and over the inner end of the supporting member 9 and carries diametrically opposed fixed pins or trunnions 11' on its sides.

A heater supporting and retaining housing 12 having a reduced upstanding neck on its upper side, is firmly, though detachably connectable to the fixture 11. To effect such connection, diametrically opposed bayonet-slots 13 are formed in the sides of its neck. Thus, when said neck is telescopically associated with the lower and adjacent end of the fixture, in the manner well shown in Figure 2 of the drawings, the fixture pins 11' are entered longitudinally into and through the slots 13 and with partial rotation of the neck, are moved laterally into the slot inner extremities.

Received and immovably supported within the housing 12 is a suitable form of electrical heater 14. Electrical conductors 15 are connected to and extended from the terminals of the heater through a fixed wall in the housing neck 12' and have an electrical connector 16 thereon.

To supply electric energy to the heater 14, via its lead-in conductors 15, other electrical conductors 17, extended from a suitable source of power (not shown) are passed through the tubular supporting member 9 from its outer end into detachable electrical contact with the aforesaid connector 16 by means of a conventional form of fixture 18.

Because of the positioning of the inner end of the supporting member 9 with relation to the reservoir bottom, it will be seen (note Figure 1 of the drawings) that the heater receiving and supporting casing 12 will be disposed in immediate proximity to the reservoir bottom opposite the access providing opening therein. The cross-sectional shape and size of the heater housing 12, in comparison with said access providing opening, is such that the former may be conveniently and readily entered through the latter into the reservoir 1, so as to effect its electrical attachment to the energy supply conductors 17 and its mechanical supporting connection to the adjacent end of the supporting member 9 in the manner heretofore described. Also, it will be understood that equally convenient access may be had to the casing for its detachment and removal, as well as for required inspection, repair, replacement work and the like, in connection with the electrical heater.

Following the above described installation of my improved heating device, it will be understood that the reservoir access providing opening is closed by engaging the closure 6 therein tightly on its gasketed seat.

In usage of the invention and assuming that the compressed air reservoir is operatively installed as hereinbefore described, as and when condensation occurs within said reservoir because of internal and external temperature variances, the resulting water will settle to its bottom about, and at times, over the heater carrying casing 12 supported from the fixed, though vertically adjustable, member 9. Should the atmospheric temperature to which said reservoir is exposed and subjected be at or below a water freezing degree, the water of condensation accumulated within the reservoir is most apt to be frozen and hence, become non-flowable, or partially so. Therefore, the "blowing-out" of the water from the reservoir to remove the greatest possible amount of moisture from the brake actuating compressed air prior to its entry into and flowing through the air brake system line will be prevented. At such times, the electrical heater 14 within the casing 12 is energized, causing it to be heated and the heat therefrom radiated, via said casing, to the condensation water ice, thawing and converting it into flowable form. The drain valve 7 is now opened and the condensation water, under pressure from the reservoir stored compressed air, will be forcibly discharged from the reservoir. Following such expulsion of the condensate from the reservoir and de-energization of the heater device, it is preferable that the drain valve 7 be permitted to remain open for a period of time sufficient to reduce the internal temperature of said reservoir to a degree substantially coinciding with that of the outside or atmospheric temperature, whereupon the valve is closed. By so doing, it is obvious that further condensation of air within the reservoir will be materially retarded. In consequence, the supply of substantially moisture free compressed air from the reservoir to the brake system line for positive train car brake actuation will be maintained for a maximum period of time.

By periodical use of my invention, it will be understood and appreciated by workers skilled in this art that the air brakes of rolling stock of railway trains will be prevented from partial and/or total operational failure in cold and frigid atmospheres, due to the blockage or structural deterioration of the brake air lines, couplings and associate component parts by ice and slush formations therein, due to the flowing of excessively moisture laden air and/or condensate therethrough. As the result of this, those hazards associated with such braking inadequacies and deficiencies will be greatly reduced, if not eliminated.

Because of the screw-threading of the tubular supporting member 9 throughout or partially throughout its length, vertical adjustment of the same to bring its inner end into different relationships of proximity to the reservoir bottom may be optionally effected. Thereby the positioning of the heater carrying housing 12 in relation to said reservoir bottom may be varied to improve its heating efficiency or contact with the condensation water in the reservoir.

While I have hereinbefore described the usage and operational advantages of my invention in or during the existence of cold or frigid atmospheres, it is in no manner so limited. Thus, it is to be noted and understood that the hereinbefore described demoisturizing of the train or car brake actuating compressed air prior to its entering into and flowing through the air conducting line of an equipped system, will prevent the subjection of such line to the deteriorating effects of excessive amounts of condensate therein during the existence of non-freezing atmospheric conditions, but atmospheric conditions sufficient in degree to effect condensation within the compressed air reservoir.

I claim:

1. A heating and thawing device for the compressed air storage tanks of air brake systems, including a storage tank having an opening in its bottom whereby to provide working access to the interior thereof, a valved closure removably engaged in said opening, a vertical tubular supporting member within the tank above and aligned with said opening in its bottom, the upper end of which extends through and is connected to the top of said tank, an inverted cup-like member connected to the lower end of the tubular supporting member and spaced above the opening in the tank bottom, a housing below said cup-like member and above said tank bottom opening having an upstanding neck on and communicating with its upper side, the cross-sectional size of said neck being sufficient to permit its snug and detachable telescopic engagement over and about the open lower end of the inverted cup-like member, connecting means on said cup-like member detachably engaged with the telescopically engaged portion of the upstanding neck, electrical heating means within said housing, electrical conductors extended through and beyond the tubular supporting member, and a detachable electric connection connected to the conductor ends within said inverted cup-like member for detachable electrical connection with the terminals of the electrical heating means.

2. A heating and thawing device for the compressed air storage tanks of air brake systems including a storage tank having an opening in its bottom whereby to provide working access to the interior thereof, a valved closure removably engaged in said opening, a vertical externally screw-threaded tubular supporting member adjustably threadedly engaged with and through a portion of the tank top and aligned with said opening in its bottom, an inverted cup-like member connected to the lower end of the tubular supporting member and spaced above the opening in the tank bottom, a closed housing below said cup-like member and above said tank bottom opening, the size of said housing being less than that of the opening in the tank bottom and the upper side of said housing having an upstanding neck on and communicating with the same, the cross-sectional size of said neck being sufficient to permit its snug and detachable telescopic engagement over and about the open lower end of the inverted cup-like member, connecting means on said cup-like member detachably engaged with the telescopically engaged portion of the upstanding neck, electrical heating means within said housing, electrical conductors extended through and beyond the tubular supporting member, and a detachable electric connection connected to the conductor ends within said inverted cup-like member for detachable electrical connection with the terminals of the electrical heating means.

THOMAS A. RAINES.

References Cited in the file of this patent
UNITED STATES PATENTS

| Number | Name | Date |
|---|---|---|
| 1,455,246 | Furstenau | May 15, 1923 |
| 2,007,358 | Anger | July 9, 1935 |
| 2,209,430 | Turshin | July 30, 1940 |
| 2,542,543 | Losee | Feb. 20, 1951 |